3,310,540
WATER-SOLUBLE POLYMERS
James C. Fang, Springfield, Pa., assignor to E. I. du Pont de Nemours and Company, Wilmington, Del., a corporation of Delaware
No Drawing. Filed Aug. 2, 1962, Ser. No. 214,192
2 Claims. (Cl. 260—79.7)

This invention relates to a new class of water-soluble polymers and a process for making them. It in particular relates to a new class of water-soluble ethylenic polymers, with pendant sulfonium groups, that can be insolubilized on heating.

The polymers of this invention comprise the addition polymers and copolymers of $\alpha,\beta$-unsaturated carboxylic acid esters of $C_2$ to $C_4$ alcohols where the alcohol moiety bears a dihydrocarbylsulfonium salt radical attached thereto by the sulfur atom of said sulfonium salt. Thus, these polymers can be described as being the dihydrocarbylsulfonium-salt-bearing alkyl esters of $\alpha,\beta$-unsaturated carboxylic acid addition polymers and copolymers. Particularly preferred polymers are the methyl and ethyl sulfonium halide salts of hydrocarbylthioethanol esters of acrylic or methacrylic acid polymers.

The polymers of this invention thus are polycations, i.e., they are essentially linear ethylenic-addition polymers having pendant sulfonium cations. They are readily prepared by alkylating the sulfur atoms of hydrocarbylthioalkyl carboxylate polymers with such agents as primary or secondary dialkyl sulfates or alkyl halides under substantially anhydrous conditions.

The polymers of this invention combine water solubility, film toughness and heat convertibility in a polymer having the general durability and lightness of color distinctive of acrylic resins. Thus, they are useful as adhesives, coatings, and finishes for textiles, leathers, wood, plastics, metals and glass whereby they are particularly valuable in industry because they avoid the use of organic solvents and the attendant fire and explosion hazards. Some of the physical properties of the polymers are dependent on their molecular weight, the lower members being generally viscous liquids and the higher members solid thermoplastic resins or elastomers. Such polymers are useful further as dispersing or wetting agents in coatings and in vinyl and similar polymerizations for they insolubilize on subsequent heat treatment, and thereby eliminate an important source of water sensitivity in the coating. These polymers further, being polycations, can be used as anion scavengers and can be converted also into ion exchange resins by incorporating therein and cross-linking by means of, various difunctional vinyl and other compounds well known in the art.

Hydrocarbylthioalkyl esters used in making the polymers of this invention include the esters of such $\alpha,\beta$-ethylenically unsaturated acids as acrylic, methacrylic, itaconic, maleic, fumaric, sorbic and crotonic. The hydrocarbylthioalkyl portion of such esters can be derived from such $C_3$ to $C_{14}$ hydrocarbylthioalkanols having therein the specified $C_2$ to $C_4$ alkanol portion as:

methylthioethanol
ethylthioethanol
methylthiopropanol
propylthioethanol
ethylthiopropanol
methylthiobutanol
ethylthiobutanol
pentylthioethanol
heptylthioethanol
p-methylthiophenylethanol
benzylthioethanol
vinylthioethanol
nonylthioethanol
phenylthioethanol
phenylthiobutanol
cyclohexylthioethanol
cyclohexylthiopropanol These hydrocarbylthioalkanols in turn can be prepared by the reaction of sodio derivatives of the corresponding hydrocarbyl mercaptans with the appropriate chloroalkanol. In some cases, addition of ethylene oxide, propylene oxide or butylene oxide to the corresponding hydrocarbyl mercaptan can be used to prepare the hydrocarbylthioalkanols.

These esters are in turn prepared by conventional esterification procedures and are then polymerized by bulk, solution, emulsion or other processes well known in art as exemplified in U.S. 2,925,406 to form a base polymer (base, in contrast to the final cation-bearing polymer of this invention). The polymerization of the base polymer can include other ethylenic type comonomers such as the alkyl esters of the above-named unsaturated acids, vinyl esters of $C_2$ to $C_{18}$ carboxylic acids, vinyl ethers, vinyl halides, styrene, butadienes, acrylonitrile, acrylamide, maleic and itaconic anhydride, etc.

After the base polymer is prepared, alkylation is carried out by dissolving the base polymer in an inert solvent and treating it under substantially anhydrous conditions with one or more agents such as methyl bromide, methyl iodide, ethyl bromide, ethyl iodide, ethyl chloride, dimethyl sulfate and diethyl sulfate whereby the sulfur atoms of the polymer are converted to the corresponding sulfonium salts. The alkylating agent is chosen preferably so that at least one of the two hydrocarbyl groups attached to the sulfonium moiety is a methyl group. Solvents suitable as a media for carrying out the alkylation are acetonitrile, dimethyl formamide, dimethyl acetamide, dimethyl sulfoxide, dioxane, tetrahydrofuran, benzene, toluene, and similar solvents so long as they also are solvents for the base polymer.

Preferably alkylation is carried out using between about 0.1 to 5.0 molar equivalent ratio of alkylating agent to total hydrocarbylthioalkyl radicals present so that where different degrees of water-solubility are required for diverse purposes, different levels of alkylation are used. The degree of copolymerization with non-salt-forming ethylenic monomers and the molecular weight as well, can be used to vary the degree of water-solubility of these polymers from jelly-like gums suitable for adhesives to fluid solutions suitable as spray, roller or strip coating compositions. Alkylation further can be carried out on a blend of several base polymers or of a blend of base polymers with separate non-alkylating polymers (i.e., devoid of thio radicals).

By the terms "sulfonium salt polymer" or "salt of a sulfonium polymer" is meant the combination of a polymer bearing pendant sulfonium cation radicals, with various anions, irrespective of whether these polymers are as isolated solids or in solution. Further, the term "salt" is meant to include the combinations with anions of both weak as well as strong acids, as well as with the hydroxide anion.

The sulfonium salt polymers of this invention can be compounded with pigments, fillers, dyes, water dispersions of waxes or polymers, etc., or with other types of water-soluble synthetic and natural materials such as polyvinyl alcohol, polyacrylamide, polyvinyl pyrrolidone, polyvinyl pyridine, starch, guargum, pectins, alkoxy celluloses, gelatins, and albumins.

Further, the the sulfonium salt polymers can be treated with agents to alter, by metathesis, the anion portion. Thus, treatment of such solutions with lead acetate followed by separation of the insoluble lead compound can convert a chloride or a sulfate form of these polymers to an acetate form. Similarly, treatment of these polymer sulfate solutions with barium hydroxide or nitrate can form respectively a hydroxide or nitrate form of these polymers. Similarly, other soluble barium, lead, silver or other metal salts that by metathesis yield separable insoluble halide or sulfate compounds are used to form other anion salts of these polymers, such as cyanide, fluoride, formate, nitrite, perchlorate, propionate and thiocyanate.

The following examples serve to illustrate the polymers of this invention:

Example I

Twenty parts of 2-ethylthioethyl methacrylate monomer, 20 parts of acetonitrile, and 0.5 part azo-bis-isobutyronitrile are charged into an autoclave. The autoclave is flushed with nitrogen, sealed and the contents heated to and maintained at about 85° C. for 16 hours while stirring. The contents of autoclave are then cooled and 20 parts of methyl iodide are added to the autoclave. After about 16 hours, the alkylation reaction is complete, and the autoclave is opened and the polymer contents precipitated by adding with stirring about 130 parts of anhydrous ethyl ether. The precipitate is decanted and washed thoroughly twice with separate 130-part portions of diethyl ether. The resulting granular product is air dried to remove the ether and then dissolved in 27 parts of distilled water to give a clear viscous solution of methylethylsulfonium ethyl methacrylate polymer iodide. The solution is then coated on a glass panel and baked in an over at 150° C. for 20 minutes. An insoluble, clear, tough coating results.

Similar results are obtained by substituting equal molar amounts of 2-ethylthioethyl acrylate or benzylthioethyl methacrylate for the methacrylate ester monomer in the above example yielding respectively methylethylsulfonium ethylacrylate polymer iodide and methylbenzylsulfonium ethylmethacrylate polymer iodide.

Example II

Ten parts of the poly 2-ethylthioethyl methacrylate polymer solution of Example I are alkylated with 9 parts of dimethyl sulfate at room temperature for about 16 hours. A methylethylsulfonium ethylmethacrylate polymer sulfate results.

Similar results are obtained by alkylating phenylthioethyl methacrylate polymer with dimethyl sulfate to form a phenylmethylsulfonium ethyl methacrylate polymer sulfate.

Example III

The water solution of the iodide salt form of the polymer of Example I is treated based on the molar iodide content with a half molar equivalent of a lead acetate solution in distilled water. Lead iodide precipitates and is filtered off after several hours to leave a clear solution of the acetate form of methylethylsulfonium ethyl methacrylate polymer. This solution is cast on a glass plate and dried at room temperature overnight. A clear, water-insoluble film results.

Example IV

A water solution of the sulfate salt form of the polymer of Example II is treated at 30° C. for ½ hour with a half molar equivalent of barium hydroxide and the barium sulfate is filtered off leaving a solution of methylethylsulfonium ethyl methacrylate polymer hydroxide. Similar treatment of another portion of the polymer sulfate solution with barium nitrate yields a polymer nitrate solution by precipitation of barium sulfate.

Example V

Using the equipment and procedure of Example I, a 50/50 molar ratio copolymer of methyl methacrylate and 2-methylthioethyl acrylate is prepared and alkylated with an equal molar amount of methyl iodide to yield a methyl methacrylate/dimethyl sulfonium ethyl acrylate iodide copolymer.

Example VI

Using the equipment and procedure of Example I, 20 parts of p-methylthiophenylethyl methacrylate (previously prepared by transesterifying methyl methacrylate with p-methylthiophenyl ethanol described, for example, in J. Chem. Soc.—1941, p. 642, and boiling at about 175° C. at 18 mm. Hg) are polymerized and then alkylated with about 18 to 20 parts of methyl iodide. A solution of p-(dimethyl sulfonium) phenyl ethyl methacrylate polymer iodide results.

Example VII

Example II is repeated, replacing the 9 parts of dimethylsulfate with an equal molar amount of diethyl/sulfate. A solution of diethylsulfonium ethyl methacrylate polymer sulfate results.

Example VIII

Example II is repeated, replacing the 2-ethylthioethyl methacrylate polymer solution of Example II with an equivalent amount of poly 2-ethylthioethyl acrylate polymer solution and alkylating with 9 parts of diethyl sulfate. A solution of diethylsulfonium ethyl acrylate polymer sulfate results.

Example IX

Using the equipment and procedures of Example I, replacing the 2-ethylthioethyl methacrylate monomer with an equal molar amount of 2-methylthioethyl methacrylate monomer and alkylating with methyl iodide, a solution of dimethylsulfonium ethyl methacrylate polymer iodide results.

The polymerization of Example IX is carried out in the presence of an equal molar amount of styrene based on the amount of methacrylate monomer. The resulting polymer solution is then alkylated as before with methyl iodide. A solution of the copolymer of styrene/dimethylsulfonium ethyl methacrylate iodide results.

I claim:
1. The iodide of methylethylsulfonium ethyl methacrylate polymer.
2. The sulfate of methylethylsulfonium ethyl methacrylate polymer.

References Cited by the Examiner

UNITED STATES PATENTS

| | | | |
|---|---|---|---|
| 2,925,406 | 1/1960 | McCurdy et al. | 260—79 |
| 3,212,842 | 10/1965 | Burkitt | 260—79.5 |
| 3,238,276 | 3/1966 | La Combe | 260—79.7 |
| 3,269,991 | 8/1966 | La Combe | 260—79.7 |

OTHER REFERENCES

Degering et al.: Organic Chemistry, sixth edition, © 1953, Barnes & Noble, Inc., L. C. Cat. Card No. 52-20 (page 128 relied on).

JOSEPH L. SCHOFER, *Primary Examiner.*

LEON J. BERCOVITZ, D. K. DENENBERG, M. P. HENDRICKSON, *Assistant Examiners.*